United States Patent
Mihan et al.

(10) Patent No.: US 8,859,451 B2
(45) Date of Patent: Oct. 14, 2014

(54) PROCESS FOR THE PREPARATION OF SUPPORTED CATALYSTS

(75) Inventors: Shahram Mihan, Bad Soden (DE); Volker Fraaije, Frankfurt (DE); Harald Schmitz, Weinheim (DE)

(73) Assignee: Basell Polyolefine GmbH, Wesseling (DE)

(*) Notice: Subject to any disclaimer, the term of this patent is extended or adjusted under 35 U.S.C. 154(b) by 110 days.

(21) Appl. No.: 13/514,970

(22) PCT Filed: Dec. 16, 2010

(86) PCT No.: PCT/EP2010/007670
§ 371 (c)(1),
(2), (4) Date: Jul. 25, 2012

(87) PCT Pub. No.: WO2011/072851
PCT Pub. Date: Jun. 23, 2011

(65) Prior Publication Data
US 2012/0283400 A1    Nov. 8, 2012

Related U.S. Application Data

(60) Provisional application No. 61/341,098, filed on Mar. 26, 2010.

(30) Foreign Application Priority Data

Dec. 18, 2009    (EP) ..................... 09015659

(51) Int. Cl.
| | | |
|---|---|---|
| C08F 4/646 | (2006.01) | |
| C08F 4/6592 | (2006.01) | |
| C08F 4/70 | (2006.01) | |
| C08F 10/00 | (2006.01) | |
| C08F 10/02 | (2006.01) | |
| C08F 4/659 | (2006.01) | |
| C08F 210/16 | (2006.01) | |
| C08F 4/619 | (2006.01) | |

(52) U.S. Cl.
CPC ................ C08F 4/70 (2013.01); C08F 4/6592 (2013.01); *C08F 210/16* (2013.01); C08F 10/00 (2013.01); *C08F 4/61904* (2013.01); C08F 10/02 (2013.01); C08F 4/65912 (2013.01); *C08F 4/65925* (2013.01)
USPC ........... 502/104; 502/113; 502/114; 502/152; 502/167; 526/160; 526/161; 526/165; 526/169.1

(58) Field of Classification Search
CPC ....... C08F 4/65912; C08F 4/6592; C08F 4/70
USPC .......... 502/104, 113, 152; 526/113, 114, 160, 526/161, 165, 943
See application file for complete search history.

(56) References Cited

U.S. PATENT DOCUMENTS

| | | | |
|---|---|---|---|
| 5,198,401 A | 3/1993 | Turner et al. | |
| 6,437,061 B1 * | 8/2002 | Sacchetti et al. ........... | 526/124.2 |
| 6,589,905 B1 | 7/2003 | Fischer et al. | |
| 2008/0146755 A1 * | 6/2008 | Hamed et al. ................ | 526/112 |
| 2011/0045295 A1 * | 2/2011 | Vogt et al. .................... | 428/375 |

FOREIGN PATENT DOCUMENTS

| | | |
|---|---|---|
| DE | 19833170 A1 | 1/2000 |
| EP | 0129368 | 12/1984 |
| EP | 0416815 | 3/1991 |
| EP | 0545304 | 6/1993 |
| EP | 0561479 | 9/1993 |
| EP | 0576970 | 1/1994 |
| EP | 0632063 | 1/1995 |
| EP | 0659758 | 6/1995 |
| EP | 0661300 | 7/1995 |
| WO | WO 9428034 A1 | 12/1994 |
| WO | WO-9623010 | 8/1996 |
| WO | WO-9704015 | 2/1997 |
| WO | WO-9822486 | 3/1998 |

OTHER PUBLICATIONS

Strauss, Steven H., "The Search for Larger and More Weakly Coordinating Anions", Chem. Rev. vol. 93(3) 1993, 927-942.
Boor, J., "Ziegler-Natta Catalysts and Polymerizations", New York: Academic Press 1979, 280-284.
The International PCT Search Report and Written Opinion for PCT/EP2010/007670 mailed May 18, 2011.

* cited by examiner

*Primary Examiner* — Caixia Lu

(57) ABSTRACT

The present invention refers to a process for the preparation of supported catalysts for the polymerization of olefins comprising at least a late transition metal complex, wherein the process comprises two steps. In the first step a catalytically active component comprising at least one late transition metal complex, optionally in the presence of one or more cocatalysts is mixed with a support; and in the second step the obtained mixture is treated at a reduced pressure under a flow of inert gas at a temperature equal to or below 40° C. to obtain a supported catalyst. The method is especially useful for the preparation of dual supported catalysts, useful in the gas-phase polymerization of olefins.

7 Claims, No Drawings

PROCESS FOR THE PREPARATION OF SUPPORTED CATALYSTS

This application is the U.S. national phase of International Application PCT/EP2010/007670, filed Dec. 16, 2010, claiming priority to European Patent Application 09015659.7 filed Dec. 18, 2009, and the benefit under 35 U.S.C. 119(e) of U.S. Provisional Application No. 61/341,098, filed Mar. 26, 2010; the disclosures of International Application PCT/EP2010/007670, European Patent Application 09015659.7 and U.S. Provisional Application No. 61/341,098, each as filed, are incorporated herein by reference.

FIELD OF THE INVENTION

The present invention refers to a process for the preparation of supported catalysts, in particular dual supported catalysts, useful in the gas-phase polymerization of olefins.

BACKGROUND OF THE INVENTION

When using supported catalyst systems in a gas phase process, it is often necessary to provide them as free flowing powders. In case the catalyst is prepared by a suspension method, drying of the catalyst is necessary after supportation of the catalytic active component and cocatalyst on a support material. Drying of a wet mud, which means removal of solvent to obtain a free flowing powder after a possible filtration step is commonly carried out in the art by applying vacuum or by feeding an inert gas that carries away the solvent molecules; both methods are described in literature.

According to the first method, the drying of a catalyst system is generally performed in vacuum, by applying a pressure of 2-20 kPa. Nevertheless, depending on the amount of solvent and the nature of the polymer, this operation may take unacceptably long times at industrial level; the application of vacuum to remove the solvent may require a few hours at a laboratory level and full days in commercial plants.

Therefore, at industrial level, for reducing the drying time the drying step under vacuum has to be carried out at elevated temperatures, of at least about 50° C. With defined types of catalysts, such as late transition metal catalysts, this method, however, leads to catalyst systems having decreased activity.

The second methodology used in the art to dry a supported catalyst system comprises the use of an inert gas carrying away the solvent molecules. While this method is more careful and gives catalyst system particles with better flowability, it is much less effective than applying vacuum.

Therefore, it is felt the need in the art for a method for drying a catalyst mud while maintaining a short drying time and at the same time not reducing activity of sensible catalyst systems, such as e.g. hybrid catalyst systems comprising late transition metal complexes.

Hybrid catalysts systems comprising at least one late transition metal complex, having Fe, Ni, or Co as central atom, and optionally two or more catalysts selected from metallocene complexes, containing Ti, Zr or Hf as central atom, and/or Ziegler-Natta catalysts, in combination with suitable cocatalysts, are known in the state of the art. Hybrid catalyst systems of this type are useful to generate multimodal molecular weight distributions or reactor blends of polymers having different monomer composition.

SUMMARY OF THE INVENTION

The Applicant has surprisingly found that a supported catalyst may be conveniently prepared with shorter drying times and without affecting the catalyst functionality by conducting the drying step under vacuum, at the same time feeding an inert gas flow.

The present invention is directed to a process for preparing a supported catalyst system for the polymerization of olefins comprising at least a late transition metal complex, the process comprising the following steps:
mixing a catalytically active component comprising at least one late transition metal complex, optionally in the presence of one or more cocatalysts with a support; and
treating the obtained mixture at a reduced pressure under a flow of inert gas at a temperature equal to or below 40° C. to obtain a supported catalyst.

DETAILED DESCRIPTION OF THE INVENTION

The Applicant has unexpectedly found that the process of the invention allows a considerable reduction of drying time, without the need for higher temperatures, which would lead to the deactivation of the catalysts system. When applying the process of the invention, the catalyst activity and performance of the catalytic components remain unaltered after supportation and drying.

The use of a flow of inert gas during the treatment under reduced pressure also reduces the possibility of deactivation of the catalysts system by the contact with air and oxygen. In fact, by only applying vacuum and reducing the inert gas present, the risk of leakages through valves and sealing increases, with the consequent oxygen diffusion in the drying chamber. The flow of inert gas, according to the process of the invention, reduces such risk by maintaining constant the presence of inert gas and preserving the catalyst activity. Moreover, the process of the invention gives supported catalyst with increased flowability, suitable for use in gas phase polymerization processes.

In the process of the invention, the catalytically active component comprising at least a late transition metal complex, optionally in the presence of one or more cocatalysts, are mixed with a support, and the obtained mixture is treated at a reduced pressure, preferably ranging from 1 to 40 kPa, more preferably from 1 to 25 kPa, and under a flow of an inert gas, until the solvent is removed completely or largely from the pores of the support material. The obtained supported catalyst is preferably a free-flowing powder.

The catalytically active component, optionally the cocatalyst and the support are mixed in the presence of a solvent. Suitable solvents are aprotic solvents, in particular hydrocarbons such as aromatic hydrocarbons having 6-20 carbon atoms, e.g. tetrahydrofuran (THF), toluene, ethylbenzene or xylene, or aliphatic hydrocarbons having 6-20 carbon atoms, e.g. hexane such as n-hexane or isohexane, heptane, octane or decalin or mixtures of various hydrocarbons. Particular preference is given to THF, toluene, hexane and heptane and also mixtures thereof.

Supportation may be carried out by mixing the individual catalyst components in any order. The catalytically active component and optionally the cocatalyst can be immobilized independently of one another, e.g. in succession or simultaneously. Thus, the support component can firstly be brought into contact with the cocatalyst, or the support component can firstly be brought into contact with the catalytically active component. It is also possible to add the compounds forming the catalytically active component separately. They can be added separately to the support or in combination, before the cocatalyst is added or afterwards. It is even possible to mix the support and one or more compound(s) forming the catalytically active compound in a first step, add the cocatalyst in a second step and add one or more compounds forming the catalytically active component in a third step. Preactivation of the compounds forming the catalytically active component with one or more cocatalysts before mixing with the support is also possible. In one possible embodiment, the compounds forming the catalytically active component can be prepared in the presence of the support material. A further method of immobilization is prepolymerization of the catalyst system with or without prior application to a support.

The support is preferably a porous inorganic or organic solid. The support preferably comprises at least one inorganic halide such as $MgCl_2$ or an inorganic oxide such as $SiO_2$, $Al_2O_3$, MgO, $ZrO_2$, $TiO_2$, $B_2O_3$, CaO, ZnO, $ThO_2$, carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$, $Al(NO_3)_3$ or oxides such as $Na_2O$, $K_2O$, $Li_2O$, in particular silicon oxide and/or aluminum oxide.

The support may also comprise at least one homopolymer or copolymer, e.g. polyethylene, polypropylene, polybutene, polystyrene, divinylbenzene-polystyrene, polyvinyl chloride, acryl-butadiene-styrene copolymers, polyamide, polymethacrylate, polycarbonate, polyester, polyacetal or polyvinyl alcohol. Polymer blends can also be used.

The support material may be pretreated, e.g. by heating at from 50 to 1000° C., e.g. in a stream of inert gas or under reduced pressure at from 0.01 bar to 0.001 bar, or by mixing or reacting with a chemical compound.

The inert gas may be any gas which does not react with the catalyst, e.g. a noble gas or nitrogen and preferably is nitrogen or argon.

The late transition metal complex comprises a metal of groups 8 to 10 of the Periodic Table of the Elements, preferably nickel, rhodium, platinum, iron, ruthenium, cobalt or palladium, particularly preferably a nickel, iron or palladium compound. The late transition metal complex contains, exclusively or in combination with other ligands, ligands which coordinate to the metal in a chelating fashion via two or more atoms. The two coordinating atoms are preferably nitrogen atoms.

Examples for late transition metal complexes of the catalyst composition of the present invention are nickel or palladium compounds described in WO 96/23010 A2 (which is hereby expressly incorporated by reference) which have a ligand coordinated in a bidentate fashion via nitrogen atoms.

Further and preferred examples for late transition metal complexes are tridentate complexes of formula (I):

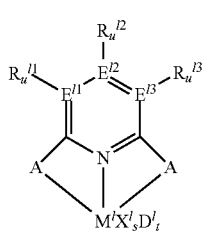

wherein the variables have the following meaning:
A independently from one another denote

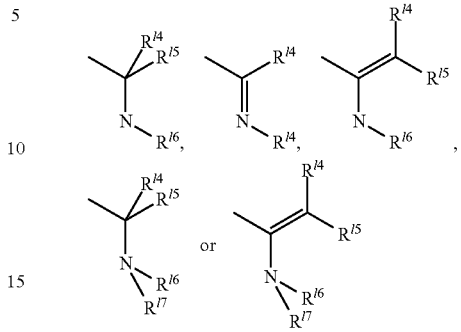

$M^I$ is Fe or Co, and preferably Fe, $R^{I1}$-$R^{I3}$ independently of one another denote hydrogen, $C_1$-$C_{22}$-alkyl, $C_2$-$C_{22}$-alkenyl, $C_6$-$C_{22}$-aryl, $NR^{I9}_2$, $OR^{I9}$, halogen, $SiR^{I8}_3$ or five-, six- or seven-membered heterocycles, which comprise at least one atom from the group consisting of N, P, O or S, wherein the organic radicals $R^{I1}$-$R^{I3}$ are optionally substituted by halogen radicals, $C_1$-$C_{10}$-alkyl radicals, $C_2$-$C_{10}$-alkenyl radicals, $C_6$-$C_{20}$-aryl radicals, $NR^{I9}_2$, $OR^{I9}$ or $SiR^{I8}_3$ and/or two radicals $R^{I1}$-$R^{I3}$ are bonded with one another to form a five-, six- or seven-membered ring and/or two radicals $R^{I1}$-$R^{I3}$ are bonded with one another to form a five-, six- or seven-membered heterocycle, which comprises at least one atom from the group consisting of N, P, O or S, $R^{I4}$, $R^{I5}$ independently of one another denote hydrogen, $C_1$-$C_{20}$-alkyl, $C_2$-$C_{20}$-alkenyl, $C_6$-$C_{20}$-aryl, or $SiR^{I8}_3$, wherein the organic radicals $R^{I4}$, $R^{I5}$ are optionally substituted by halogen radicals, $C_1$-$C_{10}$-alkyl radicals, $C_2$-$C_{10}$-alkenyl radicals, or $C_6$-$C_{20}$-aryl radicals, or two radicals $R^{I4}$, $R^{I5}$ are bonded with one another to form a five- or six-membered carbon ring, $R^{I6}$, $R^{I7}$ independently of one another denote hydrogen, $C_1$-$C_{20}$-alkyl, $C_2$-$C_{20}$-alkenyl, $C_6$-$C_{20}$-aryl, or $SiR^{I8}_3$, wherein the organic radicals $R^{I6}$, $R^{I7}$ are optionally substituted by halogen radicals, $C_1$-$C_{10}$-alkyl radicals, $C_2$-$C_{10}$-alkenyl radicals, or $C_6$-$C_{20}$-aryl radicals, or the two radicals $R^{I6}$, $R^{I7}$ are bonded with one another to form a five- or six-membered carbon ring, $R^{I8}$ independently of one another denote hydrogen, $C_1$-$C_{22}$-alkyl, $C_2$-$C_{22}$-alkenyl, $C_6$-$C_{22}$-aryl, arylalkyl having 1 to 10 carbon atoms in the alkyl radical and 6 to 20 carbon atoms in the aryl radical, $R^{I9}$ independently of one another denote hydrogen, $C_1$-$C_{22}$-alkyl, $C_2$-$C_{22}$-alkenyl, $C_6$-$C_{22}$-aryl, or $SiR^{I8}_3$, wherein the organic radicals $R^{I9}$ is optionally substituted by halogen radicals, $C_1$-$C_{10}$-alkyl radicals, $C_2$-$C_{10}$-alkenyl radicals, or $C_6$-$C_{20}$-aryl radicals, and/or two radicals $R^{I9}$ are bonded with one another to form a five- or six-membered ring, $E^{I1}$-$E^{I3}$ independently of one another denote carbon or nitrogen, u independently of one another is 0 if the respective radical is bound to nitrogen and 1 if the respective radical is bound to carbon, $X^I$ independently of one another denote fluorine, chlorine, bromine, iodine, hydrogen, $C_1$-$C_{10}$-alkyl, $C_2$-$C_{10}$-alkenyl, $C_6$-$C_{20}$-aryl, $NR^{I10}_2$, $OR^{I10}$, $SR^{I10}$, $SO_3R^{I10}$, $OC(O)R^{I10}$, CN, SCN, β-diketonate, CO, $BF_4^-$, $PF_6^-$ or bulky non-coordinating anions, wherein the organic radicals $X^I$ is optionally substituted by halogen radicals, $C_1$-$C_{10}$-alkyl radicals, $C_2$-$C_{10}$-alkenyl radicals, or $C_6$-$C_{20}$-aryl radicals, and the radicals $X^I$ are optionally bonded with one another, $R^{I10}$ independently of one another denote hydrogen, $C_1$-$C_{22}$-alkyl, $C_2$-$C_{22}$-alkenyl, $C_6$-$C_{22}$-aryl, or $SiR^{I11}_3$, wherein the organic radicals $R^{I10}$ are optionally substituted by halogen radicals, $C_1$-$C_{10}$-alkyl radicals, $C_2$-$C_{10}$-alkenyl radicals, or $C_6$-$C_{20}$-aryl radicals, $R^{I11}$ independently of one another denote hydrogen, $C_1$-$C_{20}$-alkyl, $C_2$-$C_{20}$-alkenyl, $C_6$-$C_{20}$-aryl, wherein the organic radicals $R^{I11}$ optionally substituted by halogen radicals, $C_1$-$C_{10}$-alkyl radicals, $C_2$-$C_{10}$-alkenyl radicals, or $C_6$-$C_{20}$-aryl radicals, s is 1, 2, 3 or 4, $D^I$ is a neutral donor, t is 0 to 4.

The three atoms $E^{I1}$ to $E^{I3}$ are each preferably carbon.

The substituents $R^{I1}$-$R^{I3}$ can be varied within a wide range. Possible carboorganic substituents $R^{I1}$-$R^{I3}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinal radicals $R^{I1}$ to $R^{I3}$ are optionally joined to form a 5-, 6- or 7-membered carbon ring or a five-, six- or seven-membered heterocycle containing at least one atom from the group consisting of N, P, O and S and/or the organic radicals $R^{I1}$-$R^{I3}$ are unsubstituted or substituted by halogens such as fluorine, chlorine or bromine. Furthermore, $R^{I1}$-$R^{I3}$ can also be amino $NR^{I9}_2$ or $N(SiR^{I8}_3)_2$, alkoxy or aryloxy $OR^{I9}$, for example dimethylamino, N-pyrrolidinyl, picolinyl, methoxy, ethoxy or isopropoxy or halogen such as fluorine, chlorine or bromine.

Preferred radicals $R^{I1}$-$R^{I3}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

The substituents $R^{I4}$-$R^{I7}$, too, can be varied within a wide range. Possible carboorganic substituents $R^{I4}$-$R^{I7}$ are, for example, the following: $C_1$-$C_{22}$-alkyl which are linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which are linear, cyclic or branched and in which the double bond may be internal or terminal, e.g. vinyl, 1-allyl, 2-allyl, 3-allyl, butenyl, pentenyl, hexenyl, cyclopentenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-ethylphenyl, where two geminal radicals $R^{I4}$ to $R^{I7}$ optionally are joined to form a 5-, 6- or 7-membered carbon ring and/or a five-, six- or seven-membered heterocycle containing at least one atom from the group consisting of N, P, O and S and/or the organic radicals $R^{I4}$-$R^{I7}$ are unsubstituted or substituted by halogens such as fluorine, chlorine or bromine. Furthermore, $R^{I4}$-$R^{I7}$ may be amino $NR^{I9}_2$ or $N(SiR^{I8}_3)_2$, for example dimethylamino, N-pyrrolidinyl or picolinyl. Possible radicals $R^{I8}$ in organosilicone substituents $SiR^{I8}_3$ are the same carboorganic radicals as have been described above for $R^{I1}$-$R^{I3}$, where two $R^{I9}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{I9}_3$ radicals can also be bound via nitrogen to the carbon bearing them.

Preferred radicals $R^{I4}$-$R^{I7}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{I9}_2$, in particular secondary amides such as dimethylamide, N-ethylmethylamide, diethylamide, N-methylpropylamide, N-methylisopropylamide, N-ethyliso-propylamide, dipropylamide, diisopropylamide, N-methylbutylamide, N-ethylbutylamide, N-methyltert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butyl-cyclohexylamide, dicyclohexylamide, pyrrolidine, piperidine, hexamethylenimine, decahydro-quinoline, diphenylamine, N-methylanilide or N-ethylanilide.

Variation of the radicals $R^{I9}$ enables, for example, physical properties such as solubility to be finely adjusted. Possible carboorganic substituents $R^{I9}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{I9}$ may also be joined to form a 5- or 6-membered ring and the organic radicals $R^{I9}$ may also be substituted by halogens such as fluorine, chlorine or bromine. Possible radicals $R^{I8}$ in organosilicon substituents $SiR^{I8}_3$ are the same radicals as described above for $R^{I9}$, where two radicals $R^{I8}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{I9}$.

The ligands $X^I$ result, for example, from the choice of the appropriate starting metal compounds used for the synthesis of the iron complexes, but can also be varied afterwards. Possible ligands $X^I$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^I$. As further ligands $X^I$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_6)_4^-$. Amides, alkoxides, sulfonates, carboxylates and -diketonates are also particularly useful ligands $X^I$. Some of these substituted ligands $X^I$ are particularly preferably used since they are obtainable from cheap and readily available starting materials. Thus, a particularly preferred embodiment is that in which $X^I$ is dimethylamide, methoxide, ethoxide, isopropoxide, phenoxide, naphthoxide, triflate, p-toluenesulfonate, acetate or acetylacetonate.

The number s of the ligands $X^I$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

$D^I$ is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands $D^I$ can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

Preferably, the late transition metal complex is of formula (Ia)

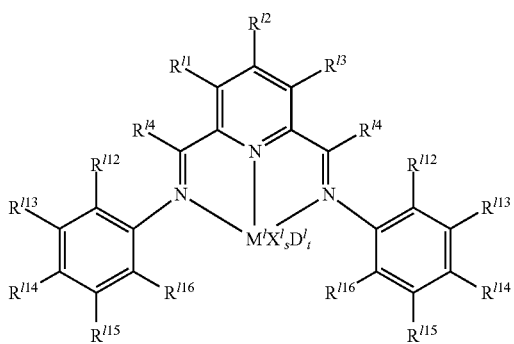

wherein the variables have the following meaning:
$M^I$, $R^{I1}$, $R^{I2}$, $R^{I3}$, $R^{I8}$, $R^{I9}$, $X^I$, $D^I$, s, and t are as defined for formula (I), $R^{I4}$ independently of one another denote hydrogen, $C_1$-$C_{20}$-alkyl, $C_2$-$C_{20}$-alkenyl, $C_6$-$C_{20}$-aryl, arylalkyl having 1 to 10 carbon atoms in the alkyl radical and 6 to 20 carbon atoms in the aryl radical, or $SiR^{I8}_3$, wherein the organic radicals $R^{I4}$ can also be substituted by halogens, $R^{I12}$-$R^{I16}$ independently of one another denote hydrogen, $C_1$-$C_{22}$-alkyl, $C_2$-$C_{22}$-alkenyl, $C_6$-$C_{22}$-aryl, arylalkyl having 1 to 10 carbon atoms in the alkyl radical and 6 to 20 carbon atoms in the aryl radical, $NR^{I9}_2$, $OR^{I9}$, halogen, $SiR^{I8}_3$ or five-, six- or seven-membered heterocyclyl, which comprises at least one atom from the group consisting of N, P, O or S, wherein the organic radicals $R^{I12}$-$R^{I16}$ are unsubstituted or substituted by halogens, $NR^{I9}_2$, $OR^{I9}$ or $SiR^{I8}_3$ or two radicals $R^{I12}$-$R^{I16}$ are bonded with one another to form a five-, six- or seven-membered ring or two radicals $R^{I12}$-$R^{I16}$ are bonded with one another to form a five-, six- or seven-membered heterocyclyl, which comprises at least one atom from the group consisting of N, P, O or S, wherein at least one of the radicals $R^{I12}$-$R^{I16}$ is selected from the group consisting of chlorine, bromine, iodine, $CF_3$ or $OR^{I9}$.

The substituents $R^{I4}$ can be varied within a wide range. Possible carboorganic substituents $R^{I4}$ are, for example, the following: hydrogen, $C_1$-$C_{22}$-alkyl which is linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which is unsubstituted or bears a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which is linear, cyclic or branched and in which the double bond is internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which is may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{I4}$ are unsubstituted or substituted by halogens such as fluorine, chlorine or bromine. Furthermore, $R^{I4}$ can be amino $NR^{I9}_2$ or $N(SiR^{I8}_3)_2$, for example dimethylamino, N-pyrrolidinyl or picolinyl. Possible radicals $R^{I8}$ in organosilicon substituents $SiR^{I8}_3$ are the same carboorganic radicals as described above for $R^{I1}$-$R^{I3}$ in formula (I), where two radicals $R^{I9}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{I9}_3$ radicals can also be bound via nitrogen to the carbon bearing them.

Preferred radicals $R^{I4}$ are hydrogen, methyl, ethyl, n-propyl, isopropyl, n-butyl, isobutyl, tert-butyl, n-pentyl, n-hexyl, n-heptyl, n-octyl or benzyl, in particular hydrogen or methyl.

The substituents $R^{I12}$-$R^{I16}$ can be varied within a wide range. Possible carboorganic substituents $R^{I12}$-$R^{I16}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinakl radicals $R^{I12}$-$R^{I16}$ are optionally joined to form a 5-, 6- or 7-membered ring and/or a five-, six- or seven-membered heterocycle containing at least one atom from the group consisting of N, P, O and S and/or the organic radicals $R^{I12}$-$R^{I16}$ are unsubstituted or substituted by halogens such as fluorine, chlorine or bromine. Furthermore, $R^{I12}$-$R^{I16}$ can also be amino $NR^{I9}_2$ or $N(SiR^{I8}_3)_2$, alkoxy or aryloxy $OR^{I9}$, for example dimethylamino, N-pyrrolidinyl, picolinyl, methoxy, ethoxy or isopropoxy or halogen such as fluorine, chlorine or bromine. Possible radicals $R^{I8}$ in organosilicon substituents $SiR^{I8}_3$ are the same carboorganic radicals as have been described above in formula (I).

Preferred radicals $R^{I12}$, $R^{I16}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{I12}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{I16}$ are each a halogen such as fluorine, chlorine or bromine. Particular preference is given to $R^{I12}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{I16}$ each being a halogen such as fluorine, chlorine or bromine.

Preferred radicals $R^{I13}$-$R^{I15}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. It is in particular preferred, that $R^{I14}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{I13}$ and $R^{I15}$ are each hydrogen.

In the most preferred embodiment the radicals $R^{I13}$ and $R^{I15}$ are identical, $R^{I12}$ are identical, $R^{I14}$ are identical, and $R^{I16}$ are identical.

The preparation of the late transition metal catalysts is described, for example, in J. Am. Chem. Soc. 120, p. 4049 ff. (1998), J. Chem. Soc., Chem. Commun. 1998, 849 and WO 98/27124. Preferred late transition metal catalysts are 2,6-diacetylpyridinebis(2,6-dimethylphenylimine)iron dichloride, 2,6-diacetylpyridinebis(2,4,6-trimethylphenylimine) iron dichloride, 2,6-diacetylpyridinebis(2-chloro-6-methylphenylimine)iron dichloride, 2,6-diacetylpyridinebis (2,6-diisopropylphenylimine)iron dichloride, 2,6-diacetylpyridinebis(2,6-dichlorophenylimine)iron dichloride, 2,6-pyridinedicarboxaldehydebis(2,6-diisopropylphenylimine)iron dichloride, diacetylpyridinebis(2,6-dichlorophenylimine)iron dichloride, diacetylpyridinebis(2,6-difluorophenylimine)iron dichloride, diacetylpyridinebis (2,6-dibromophenylimine)iron dichloride or the respective dibromides or tribromides. A large number of examples for late transition metal complexes which are suitable for olefin polymerization are described in Chem. Rev. 2000, Vol. 100, No. 4, 1169 ff.

The supportation method is also suitable for dual catalysts systems, i.e. catalyst systems which comprise additional to the late transition metal compound a second catalytically active catalyst component. The second catalytically active catalyst component also may be a late transition metal compound, e.g. of the same kind as described for the preferred example above but also other kinds of late transition metal complexes. Further examples are so-called Ziegler-Natta and/or metallocene-type catalysts. These types of catalysts are well-known in the polyolefin field, see for instance J. Boor, Ziegler-Natta Catalysts and Polymerizations. New York: Academic Press, 1979, pp 280-284, European Patent Application 416,815; and U.S. Pat. No. 5,198,401.

The process is particularly well-suited to organic transition metal compounds having at least one cyclopentadienyl ligand as the second catalytically active catalyst component. Suitable catalytically active components are especially metallocene-type catalysts as described in Another class of suitable catalysts comprise compounds having at least one ligand which is formed by a cyclopentadienyl or heterocyclopentadienyl and a fused-on heterocycle, with the heterocycles preferably being aromatic and preferably containing nitrogen and/or sulfur. Such compounds are described, for example, in WO 98/22486. These are, in particular, dimethylsilanediyl(2-methyl-4-phenylindenyl)(2,5-dimethyl-N-phenyl-4-azapentalene)zirconium dichloride, dimethylsilanediylbis(2-methyl-4-phenyl-4-hydroazulenyl)zirconium dichloride, dimethylsilanediylbis(2-ethyl-4-phenyl-4-hydroazulenyl) zirconium dichloride, bis(2,5-dimethyl-N-phenyl-4-azapentalene)zirconium dichloride or (indenyl)(2,5-dimethyl-N-phenyl-4-aza-pentalene)zirconium dichloride.

Metallocene catalysts can be used as a second catalytically active catalyst component. Metallocene catalysts are cyclopentadienyl complexes comprising one, two or three cyclopentadienyl ligands. In the present application, cyclopentadienyl ligand is understood as meaning any system which comprises a cyclic 5 membered ring system having 6 π electrons, such as, for example, indenyl or fluorenyl systems. Metallocene complexes of metals of group 3 and the lanthanoid group (e.g. lanthanum or yttrium) as well as metals of group 4 (e.g. titanium, zirconium or hafnium), 5 (e.g. vanadium or niobium) or 6 of the Periodic Table of the Elements (e.g. chromium or molybdenum) are preferred, and cyclopentadienyl complexes of titanium, zirconium or hafnium are particularly preferred. The cyclopentadienyl complexes can be e.g. bridged or non-bridged dicyclopentadienyl complexes, such as are described e.g. in EP 129 368, EP 561 479, EP 545 304 and EP 576 970 or monocyclopentadienyl complexes, such as bridged amidocyclopentadienyl complexes which are described e.g. in EP 416 815. Multinuclear cyclopentadienyl complexes are described e.g. in EP 632 063, π-ligand-substituted tetrahydropentalenes are described e.g. in EP 659 758 or π-ligand-substituted tetrahydroindenes are described e.g. in EP 661 300.

Specific examples are:
bis(cyclopentadienyl)hafnium dichloride, bis(indenyl) hafnium dichloride, bis(fluorenyl)hafnium dichloride, bis (tetrahydroindenyl)hafnium dichloride, bis(pentamethylcyclopentadienyl)hafnium dichloride, bis (trimethylsilylcyclopentadienyl)hafnium dichloride, bis (trimethoxysilylcyclopenta-dienyl)hafnium dichloride, bis (ethylcyclopentadienyl)hafnium dichloride, bis (isobutylcyclopentadi-enyl)hafnium dichloride, bis(3-butenylcyclopentadienyl)hafnium dichloride, bis (methylcyclopenta-dienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopenta-dienyl)hafnium dichloride, bis(1-n-butyl-3-methylcyclopentadienyl)hafnium dichloride, (cyclopenta-dienyl)(methylcyclopentadienyl)hafnium dichloride, (cyclopentadienyl)(n-butylcyclopenta-dienyl)hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetramethylcyclo-pentadienyl)hafnium dichloride, and also the corresponding dimethylhafnium compounds. Further examples of particularly useful complexes (Ib) are dimethylsilanediylbis(cyclopentadienyl)zirconium dichloride, dimethylsilanediylbis(indenyl)zirconium dichloride, dimethylsilanediyl-bis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(tetra-methylcyclopentadienyl)zirconium dichloride, dimethylsilanediylbis(3-trimethylsilylcyclopenta-dienyl)zirconium dichloride, dimethylsilanediylbis(3-methylcyclopentadienyl)zirconium dichloride, dimethylsilanediylbis(3-n-butylcyclopentadienyl)zirconium dichloride, dimethylsilanediylbis(3-tert-butyl-5-methylcyclopentadienyl)zirconium dichloride, dimethylsilanediylbis(3-tert-butyl-5-ethyl-cyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butyl-indenyl)zirconium dichloride, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methyl-4,5-benzindenyl)zirconium dichloride, dimethylsilanediylbis(2-ethyl-4,5-benzindenyl)zirconium dichloride, methylphenylsilanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilanediylbis(2-methylindenyl)hafnium dichloride, dimethylsilanediylbis(2-methyl-4-phenylindenyl)zirconium dichloride, dimethylsilanediylbis(2-ethyl-4-phenylindenyl)zirconium dichloride, dimethylsilanediylbis(2-methyl-4-(1-naphthyl)indenyl)zirconium dichloride, dimethylsilanediylbis(2-ethyl-4-(1-naphthyl)indenyl)zirconium dichloride, dimethylsilanediylbis(2-propyl-4-(1-naphthyl)indenyl)zirconium dichloride, dimethylsilanediylbis(2-i-butyl-4-(1-naphthyl)-indenyl)zirconium dichloride, dimethylsilanediylbis(2-propyl-4-(9-phenanthryl)indenyl)zirconium dichloride, dimethylsilanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)zirconium dichloride, dimethylsilanediylbis(2-methyl-4[p-trifluoromethylphenyl]indenyl)zirconium dichloride, dimethylsilanediylbis(2-methyl-4-[3',5'-dimethylphenyl]indenyl)zirconium dichloride, dimethylsilanediylbis(2-methyl-4-[4'-tert-butyl-phenyl]indenyl)zirconium dichloride, diethylsilanediylbis(2-methyl-4-[4'-tert-butylphenyl]indenyl)-zirconium dichloride, dimethylsilanediylbis(2-ethyl-4-[4'-tert-butylphenyl]indenyl)zirconium dichloride, dimethylsilanediylbis(2-propyl-4-[4'-tert-butylphenyl]indenyl) zirconium dichloride, dimethylsilanediylbis(2-isopropyl-4-[4'-tert-butylphenyl]indenyl)zirconium dichloride, dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride, dimethylsilanediyl(2-isopropyl-4-phenylindenyl)(2-methyl-4-phenylindenyl)zirconium dichloride, dimethylsilanediyl(2-isopropyl-4-(1-naphthyl)indenyl)(2-methyl-4-(1-naphthyl)indenyl)zirconium dichloride, dimethylsilanediyl(2-isopropyl-4-[4'-tert-butylphenyl]indenyl)(2-methyl-4-[4'-tert-butylphenyl]-indenyl)zirconium dichloride, dimethylsilanediyl(2-isopropyl-4-[4'-tert-butylphenyl]indenyl)(2-ethyl-4-[4'-tert-butylphenyl]indenyl)zirconium dichloride, dimethylsilanediyl(2-isopropyl-4-[4'-tert-butylphenyl]indenyl)(2-methyl-4-[3',5'-bis-tert-butylphenyl]indenyl)zirconium dichloride, dimethylsilanediyl(2-isopropyl-4-[4'-tert-butylphenyl]indenyl)(2-methyl-4-[1'-naphthyl]indenyl)-zirconium dichloride and ethylene(2-isopropyl-4-[4'-tert-butylphenyl]indenyl)(2-methyl-4-[4'-tert-butylphenyl]indenyl)zirconium dichloride, and also the corresponding dimethylzirconium, monochloromono(alkylaryloxy)zirconium and di(alkylaryloxy)zirconium compounds. The complexes are preferably used in the rac form. The preparation of such systems is disclosed, for example, in WO 97/28170 A1.

In the case of mixture of a late transition metal catalyst with a metallocene catalysts, the molar ratio between the metal of the metallocene catalyst and the metal of late transition metal catalyst is preferably in the range from 500:1 to 1:100, more preferably from 200:1 to 1:50, and even more preferably from 150:1 to 1:1.

The mixed catalysts may also contain one or more cocatalysts, in particular Lewis acid compounds of the general formula (II)

$$M^{II}X^{II1}X^{II2}X^{II3} \qquad (II)$$

wherein $M^{II}$ is an element of group 13 of the Periodic Table of the Elements, preferably B, Al or Ga, and more preferably B, $X^{II1}$, $X^{II2}$ and $X^{II}3$ are each, independently of one another, hydrogen, $C_1$-$C_{10}$-alkyl, $C_6$-$C_{15}$-aryl, alkylaryl, arylalkyl, haloalkyl or haloaryl having from 1 to 10 carbon atoms in the alkyl radical and from 6 to 20 carbon atoms in the aryl radical, or fluorine, chlorine, bromine or iodine, preferably a haloaryl, and more preferably pentafluorophenyl.

Suitable aluminum activating compounds are trialkylaluminum and compounds derived therefrom, in which an alkyl group has been replaced by an alkoxy group or by a halogen atom, for example by chlorine or bromine. The alkyl groups can be identical or different. Both linear and branched alkyl groups are possible.

Preference is given to trialkylaluminum compounds wherein the alkyl groups have from 1 to 8 carbon atoms, such as trimethylaluminum, triethylaluminum, triisobutylaluminum, trioctylaluminum, methyldiethylaluminum and mixtures thereof. According to a preferred embodiment, the activating compound is selected from the group consisting of trimethylaluminum (TMA), triethylaluminum (TEA), triisobutylaluminum (TIBA) and mixtures thereof.

Suitable activating compounds also include boranes and boroxins, e.g. trialkylborane, triarylborane or trimethylboroxin. Particular preference is given to boranes bearing at least two perfluorinated aryl radicals. Particular preference is given to compounds of formula (II) wherein $X^{II1}$, $X^{II2}$ and $X^{II3}$ are identical, such as triphenylborane, tris(4-fluorophenyl)borane, tris(3,5-difluorophenyl)borane, tris(4-fluoromethylphenyl)borane, tris(pentafluorophenyl)borane, tris (tolyl)borane, tris(3,5-dimethylphenyl)borane, tris(3,5-difluorophenyl)borane or tris(3,4,5trifluorophenyl)borane. Tris(pentafluorophenyl)borane is preferably used.

The activating compounds may be prepared by reaction of aluminum or boron compounds of the formula (II) with water, alcohols, phenol derivatives, thiophenol derivatives or aniline derivatives, with the halogenated and especially the perfluorinated alcohols and phenols being of particular importance. Examples of particularly suitable compounds are pentafluorophenol, 1,1-bis(pentafluorophenyl)methanol and 4-hydroxy-2,2',3,3',4,4',5,5',6,6'-nonafluorobiphenyl. Examples of combinations of compounds of the formula (II) with Brönsted acids are first and foremost trimethylaluminum/pentafluorophenol, trimethylaluminum/1-bis(pentafluorophenyl) methanol, trimethylaluminum/4-hydroxy-2,2',3,3',4,4', 5,5',6,6'-nonafluorobiphenyl, triethylaluminum/pentafluorophenol, triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (II), $R^{1.4}$ is an OH group, as in, for example, boronic acids and borinic acids, with preference being given to borinic acids having perfluorinated aryl radicals, for example $(C_6F_5)_2BOH$.

Strong Lewis acids which are suitable as activating compounds also include the reaction products of a boric acid with two equivalents of an aluminum trialkyl or the reaction products of an aluminum trialkyl with two equivalents of an acidic fluorinated, preferably perfluorinated hydrocarbon compounds, such as pentafluorophenol or bis(pentafluorophenyl) borinic acid.

Suitable cocatalysts are also aluminoxanes, for example as described in WO 00/31090. Oligomeric aluminoxane compounds are usually prepared by controlled reaction of a solution of trialkylaluminum, preferably trimethylaluminum, with water. In general, the oligomeric aluminoxane compounds obtained in this way are present as mixtures of both linear and cyclic chain molecules of various lengths, so that I is to be regarded as an average. The aluminoxane compounds can also be present in admixture with other metal alkyls, usually with aluminum alkyls.

Furthermore, modified aluminoxanes in which some of the hydrocarbon radicals have been replaced by hydrogen atoms or alkoxy, aryloxy, siloxy or amide radicals can also be used.

The molar ratio of the metal (preferably Al) in activating compound to the catalyst metal preferably ranges from 20,000:1 to 1:1, more preferably 1,000:1 to 10:1. It is possible to activate the different polymerization catalysts using the same cocatalyst or different cocatalysts.

The supported catalyst system obtained with the process of the invention can be used in the homo or copolymerization of α-olefins, such as ethylene or $C_3$-$C_{20}$ α-olefins. The polymerization temperature is preferably in the range from −60 to 350° C., more preferably in the range from 20 to 300° C., and even more preferably from 25 to 150° C. The polymerization pressure preferably is in the range of from 0.5 to 4000 bar, more preferably from 1 to 100 bar and, and even more preferably from 3 to 40 bar.

The polymerization can be carried out in bulk, in suspension, in the gas phase or in a supercritical medium, in conventional reactors for the polymerization of olefins. Among the above-mentioned alternative polymerization processes, particular preference is given to gas-phase polymerization, preferably carried out in gas-phase fluidized-bed reactors, to solution polymerization and to suspension polymerization, preferably in loop reactors and stirred tank reactors. The gas-phase polymerization can also be carried out in the condensed or supercondensed mode, in which part of the circulating gas is cooled to below the dew point and is recirculated as a two-phase mixture to the reactor.

According to a further alternative embodiment, it is possible to use a multizone reactor comprising two distinct polymerization zones connected to one another, by passing the polymer alternately through these two zones a predetermined number of times, as described in WO 97/04015.

The following examples illustrate the invention without restricting the scope thereof.

Example 1

1.1 2,6-Diacetylpyridine bis(2-chloro-4,6-dimethylphenylimine) iron dichloride 1.1a 2,6-Diacetylpyridine bis(2-chloro-4,6-dimethylphenylimine)

In a 200 ml round bottom flask, 2.0 g of 2,6-diacetylpyridine (M=163.176 g/mol, 0.0123 mol) and 75 ml of methanol were placed. Next 3.81 g of 2-chloro-4,6-dimethylaniline (M=155.627 g/mol, 0.0245 mole) and three drops of formic acid were added and the solution stirred at room temperature under nitrogen for four days, at which time no precipitate had formed. The reaction then was refluxed for 24 h. GC analysis indicated that the reaction was incomplete. Refluxing was continued for a total of 1 week. Solvent was stripped from the reaction mixture via rotary evaporator. Flash chromatography through a basic alumina column (eluted with hexane/ethyl acetate 20:1) lead to isolation of an oil. The oil was then crystallized from methanol/methylene chloride to receive pale yellow crystals.

1.1b [2,6-Diacetylpyridine bis(2-chloro-4,6dimethylphenylimine)]iron dichloride

In a dry, oxygen-free atmosphere $FeCl_2$ (anhydrous, 0.100 g) was slurried in 10 ml dry THF. 2,6-Diacetylpyridine bis(2-chloro-4,6-dimethylphenylimine) (0.378 g) was added and the solution slowly turned dark and a blue precipitate formed. The mixture was stirred at room temperature for 3 days after which the product was filtered off, washed with pentane and dried.

1.2 Bis(n-butylcyclopentadienyl)hafnium dichloride

Bis(n-butylcyclopentadienyl)hafnium dichloride (M=491.84 g/mol) was purchased from Crompton, Bergkamen.

1.3 Preparation of a Supported Catalyst System

As a support Sylopol 2326 was used, a spray-dried silica gel commercialized by Grace, which was calcined at 600° C. for 6 hours.

A mixture of 6.77 g (11.98 mmol) of 2,6-diacetylpyridine bis(2-chloro-4,6-dimethylphenylimine) iron dichloride from Example 1.1, 82.67 g (127.3 mmol) of bis(n-butylcyclopentadienyl)hafnium dichloride from Example 1.2, and 5.31 l MAO (4.75 M in toluene, 25.2 mol, commercially available from Albemarle) were stirred at room temperature for 60 minutes; the obtained mixture was then added, under stirring, to 2400 g of the support pretreated as described above, at 0° C. Additionally, 5.5 l toluene was added via the feedline. The solution was further stirred at 20° C. for additional 2 hours (ratio (ΣFe+Hf):Al=1:140). After filtration, a washing step followed by using 4.5 l heptane. Filtration was performed at 300 kPa nitrogen pressure as maximum value. The product was predried for 30 minutes, in a nitrogen stream.

The obtained product was then dried at 35° C., under vacuum at about 10 kPa and under a flow of nitrogen as carrier gas, maintaining a reduced stirring (5-10 U/min). The time necessary to obtain the supported catalyst in the form of a free flowing powder is reported in Table 1; the supported catalyst was finally sieved (sieve: 240 μm), thus obtaining 5.1 kg of supported catalyst.

Comparative Example 1

As a support Sylopol 2326 was used, a spray-dried silica gel from Grace, which was calcined at 600° C. for 6 hours.

A mixture of 7.46 g (13.2 mmol) of 2,6-diacetylpyridinbis (2-chloro-4,6-dimethylphenylanil) iron dichloride from Example 1.1, 82.62 g (127.2 mmol) of bis(n-butylcyclopentadienyl)hafnium dichloride from Example 1.2, and 5.34 l MAO (4.75 M in toluene, 25.3 mol, commercially available from Albemarle) were stirred at 20° C. for 60 min; the obtained mixture was then added, under stirring, to 2400 g of the support pretreated as described above, at 0° C. Additionally 5.5 l toluene was added via the feedline. The solution was further stirred at 20° C. for additional 2 hours (ratio (ΣFe+Hf):Al=1:140). After filtration a washing step followed by using 4.5 l heptane. Filtration was performed at 300 kPa nitrogen pressure as maximum value. The product was predried for 30 minutes in a nitrogen stream.

The obtained product was then dried at 35° C., under vacuum at about 2 kPa, maintaining a reduced stirring (5-10 U/min). The time necessary to obtain the supported catalyst in the form of a free flowing powder is reported in Table 1; the supported catalysts was finally sieved (sieve: 240 μm), thus obtaining 5.0 kg catalyst.

Comparative Example 2

Sylopol 2326, a spray-dried silica gel from Grace, which was calcined at 600° C. for 6 hours was used as a support.

A mixture of 7.46 g (13.2 mmol) of 2,6-diacetylpyridinbis (2-chloro-4,6-dimethylphenylanil) iron dichloride from Example 1.1, 82.67 g (127.2 mmol) of bis(n-butylcyclopentadienyl)hafnium dichloride from Example 1.2, and 5.34 l MAO (4.75 M in toluene, 25.3 mol, commercially available from Albemarle) were stirred at room temperature for 60 min; the obtained mixture was then added, under stirring, to 2400 g of the support pretreated as described above, at 0° C. Additionally 5.5 l toluene were added via the feedline. The solution was further stirred at 20° C. for additional 2 hours (ratio (ΣFe+Hf):Al=1:140). After filtration a washing step followed by using 4.5 l heptane. Filtration was performed at 300 kPa nitrogen pressure as maximum value. The product was pre-dried for 30 minutes in a nitrogen stream.

The obtained product was then dried at 35° C. by using nitrogen as carrier gas, under reduced stirring (5-10 U/min). The time necessary to obtain the supported catalyst in the form of a free flowing powder is reported in Table 1; the supported catalysts was finally sieved (sieve: 240 μm), thus obtaining 5.15 kg catalyst.

TABLE 1

| No. | Method of drying | Temperature [° C.] | Time for drying [h:min] |
|---|---|---|---|
| Example 2 | $N_2$ and 10 kPa | 35 | 01:30 |
| Comp. Ex. 1 | 2 kPa | 35 | 02:35 |
| Comp. Ex. 2 | $N_2$ | 35 | 03:55 |

Example 3

Ethylene Polymerization

A 1.7-l-Steelautoclave was filled under Argon with 100 g polyethylene powder having a particle size of >1 mm at 70° C. (the polyethylene powder was already dried at 80° C. for 8 hours in vacuum and stored under Argon atmosphere). 125 mg triisobutylaluminum (TiBAl in heptane 50 mg/ml), 6.5 ml heptane as well as 50 mg Costelan AS 100 (Costelan in heptane 50 mg/ml) were added. After 5 minutes of stirring the catalyst of Example 1.3 was added and the catalyst dosing unit was rinsed with 2 ml heptane. First the pressure was increased up to 10 bar at 70° C. by adding nitrogen, subsequently a pressure of 20 bar was adjusted by feeding ethylene and hexene in constant ratio to ethylene (0.1 ml/g). The pressure of 20 bar at 70° C. was kept constant for 1 hour via adding additional ethylene and hexene, fed in constant ratio to ethylene (0.1 ml/g), during polymerization. After one hour the pressure was released. The polymer was removed from the autoclave and sieved in order to remove the polymer bed.

The trial was repeated with the catalysts prepared in Comparative Example 1 and Comparative Example 2. The polymerization conditions as well as the results are listed in Table 2

TABLE 2

| Catalyst from | Catalyst amount [mg] | Hexene [ml] | T [° C.] | Productivity [g PE/ g cat · h] | I.V. [dl/g] | Mw [kg/ mol] | Mw/ Mn | Density [g/cm³] |
|---|---|---|---|---|---|---|---|---|
| Example 1 | 199 | 8 | 70 | 302 | 2.8 | 224 | 21 | 0.940 |
| Comparative example 1 | 230 | 7 | 70 | 291 | 2.4 | 156 | 10 | 0.931 |
| Comparative Example 2 | 189 | 8 | 70 | 339 | 2.2 | 167 | 13 | 0.933 |

The invention claimed is:

1. A process for preparing a supported catalyst solid for the polymerization of olefins, the process comprising the following steps:

preparing in a first step a mixture containing a catalytically active component comprising at least one late transition metal complex, a solvent, and a support; and treating in a second step the obtained mixture at a reduced pressure under a flow of inert gas at a temperature below 40° C. to obtain a supported catalyst.

2. The process according to claim 1 wherein in the second step the pressure ranges from 1 to 40 kPa.

3. The process according to claim 2, wherein in the second step the pressure ranges from 1 to 25 kPa.

4. The process according to claim 1, wherein the mixture prepared in the first step also comprises at least one other catalytically active component selected from metallocenes, Ziegler-Natta-catalysts, or monocyclopentadienyl chromium constrained geometry complexes.

5. The process according to claim 4, wherein the mixture comprises metallocenes selected from hafnocenes or zirconocenes.

6. The process according to claim 1, wherein the mixture prepared in the first step also comprises a cocatalyst.

7. The process according to claim 1, wherein the late transition metal complex is a tridendate iron complex.

* * * * *